(12) United States Patent
Landau et al.

(10) Patent No.: US 10,399,067 B2
(45) Date of Patent: Sep. 3, 2019

(54) CATALYSTS BASED ON SILICOALUMINOPHOSPHATE SAPO-11 AND USES THEREOF

(71) Applicant: B.G. NEGEV TECHNOLOGIES AND APPLICATIONS LTD., AT BEN-GURION UNIVERSITY, Be'er-Sheva (IL)

(72) Inventors: Miron Landau, Be'er-Sheva (IL); Mordechai Herskowitz, Be'er-Sheva (IL); Moshe Rabaev, Be'er-Sheva (IL); Roksana Vidruk, Be'er-Sheva (IL)

(73) Assignee: B.G. NEGEV TECHNOLOGIES AND APPLICATIONS LTD. AT BEN-GURION UNIVERSITY, Be'er-Sheva (IL)

( * ) Notice: Subject to any disclaimer, the term of this patent is extended or adjusted under 35 U.S.C. 154(b) by 0 days.

(21) Appl. No.: 15/109,226

(22) PCT Filed: Jan. 4, 2015

(86) PCT No.: PCT/IL2015/050015
§ 371 (c)(1),
(2) Date: Jun. 30, 2016

(87) PCT Pub. No.: WO2015/102002
PCT Pub. Date: Jul. 9, 2015

(65) Prior Publication Data
US 2016/0325273 A1  Nov. 10, 2016

Related U.S. Application Data

(60) Provisional application No. 61/923,684, filed on Jan. 5, 2014.

(51) Int. Cl.
*B01J 29/85* (2006.01)
*C10G 65/12* (2006.01)
*C01B 37/08* (2006.01)
*C01B 39/54* (2006.01)
*C10G 45/64* (2006.01)
*C10G 45/58* (2006.01)
*C10G 45/68* (2006.01)
(Continued)

(52) U.S. Cl.
CPC .............. *B01J 29/85* (2013.01); *B01J 37/08* (2013.01); *C01B 37/08* (2013.01); *C01B 39/54* (2013.01);
(Continued)

(58) Field of Classification Search
None
See application file for complete search history.

(56) References Cited

U.S. PATENT DOCUMENTS 6,238,550 B1 * 5/2001 Strohmaier ............ B01J 29/005
   208/109
6,294,081 B1   9/2001 Rodriguez et al.
(Continued)

OTHER PUBLICATIONS

Ping, et al. "Acidity and Isomerization Activity of SAPO-11 Synthesized by an Improved Hydrothermal Method". Chinese Journal of Catalysis, issue 4, vol. 29 (2008).*
(Continued)

*Primary Examiner* — Sheng H Davis
(74) *Attorney, Agent, or Firm* — Nixon & Vanderhye P.C.

(57) ABSTRACT

The invention provides a process for preparing SAPO-11, that comprises combining in an aqueous solution alumina source, P 2 O source and a silica source in the presence of a crystallization template and a surfactant to form a gel, which is then subjected to hydrothermal crystallization and calcination. The so-formed SAPO-11, which possesses unique silicon distribution, high resistance to hydrothermal degradation (desilication) and high surface area, forms another aspect of the invention. Hydroprocessing of a vegetable oil in the presence of a catalyst comprising the Pt and SAPO-11 of the invention is also demonstrated.

9 Claims, 7 Drawing Sheets

(51) Int. Cl.
*C10G 3/00* (2006.01)
*B01J 37/08* (2006.01)
*C10G 45/70* (2006.01)
*B01J 35/00* (2006.01)
*B01J 27/224* (2006.01)

(52) U.S. Cl.
CPC ............... *C10G 3/44* (2013.01); *C10G 3/49* (2013.01); *C10G 3/50* (2013.01); *C10G 45/58* (2013.01); *C10G 45/64* (2013.01); *C10G 45/68* (2013.01); *C10G 45/70* (2013.01); *C10G 65/12* (2013.01); *B01J 27/224* (2013.01); *B01J 35/0006* (2013.01); *B01J 2229/186* (2013.01); *C10G 2300/202* (2013.01); *Y02P 30/20* (2015.11)

(56) References Cited

U.S. PATENT DOCUMENTS 6,306,790 B1 * 10/2001 Rodriguez ............ B01J 29/005 502/64
8,142,527 B2  3/2012 Herskowitz et al.
2001/0004626 A1  6/2001 Strohmaier et al.
2004/0230085 A1  11/2004 Jakkula et al.

OTHER PUBLICATIONS

Barrett et al., "The Determination of Pore Volume and Area Distributions in Porous Substances. I. Computations from Nitrogen Isotherms," *The Journal of American Chemical Society*, vol. 73: 373-380 (Jan. 1951).

International Preliminary Report on Patentability issued in PCT/IL2015/050015 dated Jul. 5, 2016.

International Search Report issued in App. No. PCT/IL2015/050015 dated Apr. 22, 2015.

Liu et al., "Influence of template on Si distribution of SAPO-11 and their performance for n-paraffin isomerization," *Micoporous and Mesoporous Materials*, vol. 114: 365-372 (2008).

Lutz et al., "Hydrothermal stability of zeolite SAPO-11," *Microporous and Mesoporous Materials*, vol. 132: 31-36 (2010).

Supplemental European Search Report issued in EP 15733192 dated Sep. 12, 2017 (1 page).

Liu et al., "Acidity and lsomerization Activity of SAP0-11 Synthesized by an Improved Hydrothermal Method," *Chinese Journal of Catalysts*, vol. 29, No. 4, pp. 379-384 (Apr. 2008).

* cited by examiner

CATALYSTS BASED ON SILICOALUMINOPHOSPHATE SAPO-11 AND USES THEREOF

This application is the U.S. national phase of International Application No. PCT/IL2015/050015 filed 4 Jan. 2015, which designated the U.S. and claims the benefit of U.S. Provisional Patent Application No. 61/923,684 filed 5 Jan. 2014, the entire contents of each of which are hereby incorporated by reference.

This invention relates to the synthesis of catalysts which contain crystalline silicoaluminophosphate of AEL type SAPO-11. These catalysts are useful, inter alia, for hydroprocessing of vegetable oils in the production of recyclable green transportation fuels.

Pelletized catalysts comprising silicoaluminophosphate of AEL type SAPO-11, an alumina binder and platinum as an hydrogenation component, are widely used for hydroprocessing of hydrocarbon feedstock where significant isomerization of paraffinic hydrocarbons is required for depression of cloud/pour/freeze points of transportation fuels, diesel and jet.

In its most general form, the synthesis of the silicoaluminophosphates molecular sieve takes place in an aqueous solution, where alumina source, phosphoric acid and a silica source are combined in the presence of a crystallization template, e.g., di-n-propylamine (DPA), to form a gel, which is then subjected to hydrothermal crystallization to afford the material in a form of a white powder. Following calcination, the resultant SAPO-11 is optionally mixed with a binder, e.g., an alumina binder, and formed into pellets loaded with platinum. The so-formed catalyst, comprising SAPO-11 and the metal, and optionally the binder, is conventionally denoted Pt/SAPO-11 and Pt/(SAPO-11+$Al_2O_3$), respectively.

In U.S. Pat. No. 6,294,081 it was suggested to modify the properties of the SAPO component, by carrying out the aforementioned gel formation reaction in the presence of an amine surfactant and an organic solvent, thereby arriving at a gel with the following composition:

$$1.000Al_2O_3 \cdot x_1S \cdot x_2DPA \cdot x_3P_2O_5 \cdot x_4SiO_2 \cdot x_4SiO_2 \cdot x_5H_2O \cdot x_6SOL,$$

Wherein: S—surfactant (hexadecylamine, dodecyamine, cetyltetramethylammonuium bromide etc.), DPA—the crystallization template di-n-propylamine, SOL—organic solvent, $x_1=0.000$-$0.500$, $x_2=0.2$-$2.0$; $x_3=1.00$, $x_4=0.01$-$3.00$, $x_5=4$-$300$ and $x_6=0.00$-$50$.

It was shown in U.S. Pat. No. 6,294,081 that the use of an amine surfactant alters the distribution of silicon ions embedded in the SAPO matrix. As explained in U.S. Pat. No. 6,294,081 in reference to FIG. 1 of said patent, reproduced herein in FIG. 1, there exist different silicon sites in the SAPO system, which are defined according to the number of silicon and aluminum atoms occupying the four nearest neighbor positions of any silicon ion. Thus, in the nearest environment of a silicon ion, consisting of four neighbors, the number of silicon atoms may be an integer from 4 to 0, inclusive, and correspondingly, the number of aluminum atoms varies from 0 to 4, inclusive. Thus, the nearest environment of a silicon site may be denoted in general $\{nSi,(4-n)Al, 0 \leq n \leq 4\}$, and more specifically: (4Si, 0Al); (3Si,1Al), (2Si,2Al), (1Si,3Al) and (0Si,4Al).

In U.S. Pat. No. 6,294,081, Table 1, it was shown that in the absence of a surfactant, the predominate sites are of the (4Si,0Al) type. However, the addition of a surfactant, such that the molar ratio surfactant:$Al_2O_3$ at the gel formation reaction is 0.144, shifts the state of silicon ions embedded in the resultant SAPO matrix from (4Si,0Al) to (3Si,1Al), (2Si,2Al) and (1Si,3Al). This change in the distribution of silicon sites in the SAPO-11 matrix accounts for higher catalytic activity in hydroprocessing and cracking of hydrocarbon feedstock under anhydrous conditions.

However, experimental work conducted in support of this invention and reported below shows that the activity of the Pt/(SAPO-11+$Al_2O_3$) catalysts based on the SAPO-11 disclosed in U.S. Pat. No. 6,294,081 decreases with the passage of time, when used in hydroprocessing of lipid feedstock (vegetable oils, animal fats, algae-derived oils etc.), which inevitably involve the production of water as a by-product, due to hydrodeoxygenation of triglycerides. In other words, the catalyst of U.S. Pat. No. 6,294,081 is highly effective in an anhydrous environment, but its performance deteriorates in the presence of water. Indeed, it was shown (W. Lutz et. al. Micropor. Mesopor. Mater. 132, 31, 2010) that at temperatures >195° C. the framework of SAPO-11 undergoes hydrothermal degradation due to hydrolysis of Si—O—Al bonds:

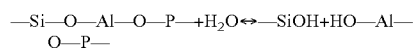

A further attempt to modify the silicon distribution of SAPO-11 with the aid of a mixture of two amine compounds, diethylamine and di-iso-propylamine employed as directing template at the stage of gel formation was reported by Liu et al. [Microporous and Mesoporous Materials 114, p. 365-372 (2008)]. $^{29}$Si-NMR analysis shown in that paper indicates that SAPO-11 was obtained where the (0Si,4Al) site is the predominant site, with concentration exceeding 60 molar %. However, the second most intense peak seen in the $^{29}$Si-NMR spectrum of the SAPO-11 is assigned to the (4Si, 0Al) site, i.e., the type of site where the nearest environment of the silicon atom is totally devoid of aluminum. Furthermore, the SAPO-11 of Liu et al. exhibits a total surface area of less than 200 $m^2/g$, meaning that its external surface area would be much lower.

It has now been found that increasing the molar ratio of surfactant (S) to $Al_2O_3$ in the gel-formation reaction beyond 0.5, and specifically, adjusting the molar ratio S:$Al_2O_3$ in the range from to 0.55-0.65, leads to a significant increase in the hydrothermal stability of the SAPO-11 ultimately recovered following the hydrothermal crystallization of the gel and calcination. The so-formed SAPO-11 displays high external surface area in combination with an advantageous distribution of the five possible silicon sites: (4Si,0Al); (3Si,1Al), (2Si,2Al), (1Si,3Al) and (0Si,4Al) characterized in the predomination of aluminum-rich silicon sites, i.e., the (1Si,3Al) and (0Si,4Al) sites, as explained in more detail below. The experimental results reported below indicate that Pt/(SAPO-11+$Al_2O_3$) catalysts based on the SAPO-11 of the invention exhibit acceptable catalytic activity combined with high hydrothermal stability and can effectively withstand the hydrous environment in hydroprocessing of lipid feedstock, allowing stable operation of the pelletized Pt/(SAPO-11+$Al_2O_3$) for more than 1000 h in hydroprocessing of lipid feedstock.

The process of the invention comprises:
(i) stirring an alumina source and $P_2O_5$ source in an aqueous medium in the presence of at least one crystallization template, and combining same with a silica source in the presence of a surfactant and an organic solvent, wherein the molar ratio surfactant: $Al_2O_3$ is above 0.5, e.g., not less than 0.55 and preferably from 0.55 to 0.65, and increasing the amount of water in the reaction mixture as the reaction advances, to form a gel; and (ii) hydrothermally crystallizing the so-formed gel, to form a powder; and
(iii) calcining said powder and collecting a solid consisting essentially of SAPO-11.

The first step of the process is a gel formation reaction, which yields a gel of the formula:

$$1.000Al_2O_3 \cdot x_1S \cdot x_2TEM \cdot x_3P_2O_5 \cdot x_4SiO_2 \cdot x_5H_2O \cdot x_6SOL,$$

wherein:
S indicates a surfactant;
TEM indicates at least one amine crystallization template;
SOL indicates an organic solvent, such as C4-C8 alkanol;
$x_1 > 0.5$, e.g., $0.55 \leq x_1$, preferably $0.55 \leq x_1 \leq 0.65$ e.g., $0.56 \leq x_1 \leq 0.63$
$x_2$ is from 0.2 to 2.0,
$x_3$ is from 0.95 to 1.05,
$x_4$ is from 0.01 to 3.00,
$x_5$ is from 4 to 300; and
$x_6$ is from 0.00 to 50.

More preferably, the gel formation reaction comprises stirring an alumina source and a $P_2O_5$ source in a first amount of water (w1), followed by the addition of at least one crystallization template. Next, a surfactant, an organic solvent and a second amount of water (w2) are added to the reaction mixture, preferably simultaneously. A silica source and a third amount of water (w3) are lastly added with further stirring, to form the gel.

Preferred alumina sources include solid aluminum hydroxide, e.g. oxyhydroxide AlOOH with pure pseudoboehmite structure, with particle size of less than 5 nm. Such alumina forms are commercially available (e.g., Dispersal P2 manufactured by Sasol Ltd). As $P_2O_5$ source, phosphoric acid, i.e., orthophosphoric acid is used. The alumina source and phosphoric acid are mixed together in a first amount of water (w1) with the weight ratio between said first amount of water and alumina being in the range from 1.6 to 120, e.g., from 50 to 70, for example, around 61. Correspondingly, the weight ratio between said first amount of water and phosphoric acid is in the range from 84 to 93, e.g., around 88. The so-formed mixture is preferably kept under stirring for a period of time of not less than 1 hour at a temperature in the range from 20 to 25° C., before a crystallization template is added. The crystallization directing agent is an amine compound, e.g., a secondary amine, which is preferably selected from the group consisting of di-n-propylamine (DPA), diethylamine and di-iso-propylamine, and a mixture thereof. DPA is especially preferred. The molar ratio alumina:DPA is preferably from 0.5 to 5.0. After the addition of the template, the reaction mixture is stirred, e.g., for a period of time of not less than 1 hour.

The addition of the surfactant to the reaction mixture takes place essentially concurrently with the addition of an organic solvent and a second amount of water (w2). The weight ratio between said second amount of water and the alumina is in the range from 0.8 to 60, e.g., around 30. Most conveniently, the surfactant, the organic solvent and the water are mixed in a separate vessel, and the so-formed surfactant-containing aqueous/organic mixture is fed to the reaction vessel. The amine surfactant is preferably a primary amine selected from the group consisting of R—$NH_2$, wherein R is an alkyl group, preferably a linear alkyl $CH_3$—$(CH_2)_m$ wherein m is from to 5 to 17, preferably 16, i.e., the surfactant is hexadecylamine. The organic solvent is partially water miscible, i.e., its miscibility in water is less than 0.59 g/100 g $H_2O$ at 20° C. For this purpose, C4-C7 alkanol can be used, especially primary alkanol such as 1-hexanol.

A silica source (e.g., tetraethylorthosilicate) is fed to the reaction vessel together with a third amount of water (w3). The weight ratio between said third amount of water and phosphoric acid is in the range from 84 to 93, e.g., around 88. The feeding of the silica source takes place either simultaneously with, or preferably shortly after, the surfactant addition. The final reaction mixture is allowed to stand under further stirring, e.g., for not less than 60 minutes.

Preferably, the added amount of water combined with the surfactant (w2), is less than the amount of water initially charged to the reaction vessel (w1), while the amount of water added concurrently with the silica source (w3), is approximately equal to w1. Preferably, the weight ratios w1:w2:w3 are in the range from 1:0.4-0.6:0.8-1.2. It is believed that dividing the total amount of water fed at the gel formation step into three consecutively added portions, at weight ratios as noted above, e.g., about 1:0.5:1, is beneficial for increasing the crystallinity of the SAPO-11 material, with the orthorhombic structure of type $Pna2_1$ with enlarged parameters of unit cell (a≥18.3 Å; b≥13.9 Å; d≥8.1 Å), that reflect presumable substitution of P atoms and less Al atoms for Si in the alumino-phosphate framework yielding higher concentration of acid sites.

The so-formed gel, having the composition:

$$1.000Al_2O_3 \cdot x_1S \cdot x_2TEM \cdot x_3P_2O_5 \cdot x_4SiO_2 \cdot x_5H_2O \cdot x_6SOL,$$

wherein S, TEM, SOL and the molar coefficients $x_1$-$x_6$ are as previously defined, and in particular, with $0.55 \leq x_1 \leq 0.65$, e.g., $0.56 \leq x_1 \leq 0.63$, (specifically $0.57 \leq x_1 \leq 0.60$) is a useful precursor for producing SAPO-11 which possesses unique silicon distribution. Thus, the gel forms another aspect of the invention.

In the second step of the process, the so-formed gel undergoes hydrothermal crystallization in a suitable reaction vessel, e.g., a stainless steel Teflon coated autoclave. The gel is preferably heated to a temperature of not less than 190° C. for not less than 3 hours. On quenching to room temperature, the so-formed solids are discharged from the vessel, washed (e.g., with ethanol, water or both), and dried. The formation of SAPO-11 material with 100% crystallinity requires only 2-5 hours of hydrothermal gel crystallization, but this yields silico-alumino-phosphates with relatively low external surface area, e.g., below 100 $m^2/g$, resulting in a low catalytic activity and relatively low hydrothermal stability due to non-uniform distribution of silicon in the framework. After crystallization for 24 hours, the external surface area increases significantly, and it reaches 240-260 $m^2/g$ after crystallization for not less than 48 hours, e.g., 48-100 h. The latter crystallization time is sufficient for equilibration of silica distribution in SAPO-framework, being optimal for preparation of hydrothermally stable material with relatively high catalytic activity. Thus, the hydrothermal crystallization is preferably conducted for more than 18 hours, e.g., not less than 24 hours, preferably not less 36 hours, and more preferably for not less than 48 hours; for example, from 36 to 90 or 100 hours.

In the third step of the process, the product is calcined for not less than 3 hours at temperature in the range from 500 to 600° C., preferably 550° C., first in nitrogen and then in air. Preferably the calcination takes place in a nitrogen flow for not less than 1 h, followed by calcination in air flow for not less than 2 h hours.

The SAPO-11 formed upon hydrothermal crystallization of a gel of the formula $1.000Al_2O_3 \cdot x_1S \cdot x_2TEM \cdot x_3P_2O_5 \cdot x_4SiO_2 \cdot x_5H_2O \cdot x_6SOL$ and successive calcination, as defined above (in particular, with $0.56 \leq x_1 \leq 0.63$, e.g., $0.57 \leq x_1 \leq 0.60$), constitutes another aspect of the invention. The SAPO-11 of the invention possesses a unique silicon distribution, demonstrated by $^{29}$Si-NMR analysis, indicating the predomination of the aluminum-rich silicon sites: the deconvoluted $^{29}$Si-NMR spectra of the SAPO-11 of the invention exhibits five peaks centered at −90 ppm (±2), −97 ppm (±2), −102 (±2) ppm, −107 (±2) ppm and −112 (±2) ppm, assigned to (0Si,4Al); (1Si,3Al), (2Si,2Al), (3Si,1Al) and (4Si,0Al), respectively, with the peaks assigned to (0Si,4Al) and (1Si,3Al) sites being the first and second most intense peaks, respectively.

Accordingly, another aspect of the invention is SAPO-11 possessing a silicon distribution, wherein the distribution of silicon atoms among the five possible silicon sites, indicated by the notation (nSi,(4-n)Al), 0≤n≤4, identifying the composition of the four nearest neighbor positions of a silicon atom in terms of the silicon and aluminum atoms filling said neighbor positions, is determined by a deconvoluted $^{29}$Si-NMR spectrum of said SAPO-11, said spectrum exhibiting five peaks centered at −90 ppm (±2), −97 ppm (±2), −103 (±2) ppm, −108 (±2) ppm and −112 (±2) ppm, assigned to (0Si,4Al); (1Si,3Al), (2Si,2Al), (3Si,1Al) and (4Si,0Al) sites respectively, wherein said $^{29}$Si-NMR spectrum indicates the predomination of aluminum-rich silicon sites (0Si,4Al) and (1Si,3Al), with the peaks assigned to (0Si,4Al) and (1Si, 3Al) sites being the first and second most intense peaks, respectively, such that the intensity of the major peak assigned to the (0Si,4Al) site indicates that the molar concentration of said site is not less than 60 molar %, and in some embodiments not less than 65 molar %, of the total number of silicon sites.

Preferably, the sum of the molar concentrations of the (0Si,4Al) and (1Si,3Al) sites constitutes not less than 75% (e.g., >80%) of the total number of silicon sites, as indicated by the deconvulated results of the $^{29}$Si-NMR spectrum of said SAPO-11.

Preferably, the ratio of the concentration of the (0Si,4Al) site to the concentration of the (1Si,3Al) is greater than 3:1 (e.g., greater than 4:1, and specifically from 4:1 to 6:1), as indicated by the deconvulated results of the $^{29}$Si-NMR spectrum of said SAPO-11.

A particularly preferred SAPO-11 of the invention possesses silicon distribution, based on the deconvoluted results of $^{29}$Si-NMR spectrum, tabulated below:

TABLE A

| site | (0Si, 4Al) | (1Si, 3Al) | (2Si, 2Al) | (3Si, 1Al) | (4Si, 0Al) |
|---|---|---|---|---|---|
| NMR peak centered at | −90 ppm (±2) | −97 ppm (±2) | −103 (±2) | −108 (±2) | −112 (±2) |
| Molar % | 60-75 | 10-20 | 7-12 | 0.3-5.0 | 0.5-4.0 |

X-ray powder diffraction analysis of the SAPO-11 of the invention indicates its high crystallinity and phase purity, detecting no other phases besides the silicoaluminophosphate SAPO-11 (FIG. 2, pattern no. 1) and its framework includes Si, Al and P in preferred atomic ratio of Si:P:Al=0.03-0.10:0.95-1.05:1.0 corresponding to $SiO_2$ content of 3-10 wt. % (EDAX). However, SAPO-11 containing APO phase and/or SAPO-41 phase, e.g., in an amount of not more than 10 wt %, preferably not more than 5 wt %, is also within the scope of the invention.

The total surface area of the calcined SAPO-11 of the invention is not less than 190 m$^2$/g, for example, from 190 to 330 m$^2$/g. Its external surface is not less than 150 m$^2$/g, preferably above 200 m$^2$/g, in some embodiments from 200 to 250 m$^2$/g, e.g., from 230 to 250 m$^2$/g. The micropore volume is not less than 0.01 cm$^3$/g, for example, from 0.01 to 0.04 cm$^3$/g. The mesopore volume is not less than 0.2 cm$^3$/g, for example, from 0.1 to 0.3 cm$^3$/g.

The SAPO-11 powder is processed to form pellets, e.g., in an extruder, and the resultant pellets are loaded with the catalytically active metal, i.e., platinum. Preferably, the SAPO-11 powder is combined with alumina binder, e.g., the same alumina source employed in the gel formation reaction, at a weight ratio SAPO-11:$Al_2O_3$ calculated on dry basis in the range from 0.9:0.1 to 0.7:0.3, prior to the step of pellet formation in the extruder. Platinum is loaded to the (SAPO-11+$Al_2O_3$) pellets after their drying-calcination by impregnating with a solution of platinum source, e.g., $H_2PtCl_6$, until incipient wetness is observed, followed by drying. The impregnation-drying cycle is repeated several times, in order to load the metal solution into the pores of (SAPO-11+$Al_2O_3$) pellets. The total amount of platinum added is approximately 0.5-1.5 wt %. However, it should be noted that the total amount of platinum added can be loaded into the catalyst in separate portions and deposited on distinct components thereof, e.g., the SAPO-11 powder can be loaded with about 0.5 wt % Pt via the aforementioned techniques or other acceptable methods, the pseudobohemite AlOOH binder powder can be separately loaded with Pt, and/or the pellets are loaded with the platinum. The pellets are calcined and afterwards subjected to reduction, e.g., exposed to a reductive environment under hydrogen flow, to form the final, catalytically active products.

On account of its enhanced hydrothermal stability in aqueous environment, Pt/(SAPO-11+$Al_2O_3$) of the invention is especially suited for catalyzing hydroprocessing processes involving hydrodeoxygenation reactions, i.e., where the feedstock consists of oxygen-containing compounds, such that the hydrogen-consuming reactions lead to the formation of a liquid consisting of the organic product and water by-product. Furthermore, the experimental results reported below indicate that the separated organic phase can be easily upgraded to meet the tight specification of diesel and jet fuels.

In particular, Pt/(SAPO-11+$Al_2O_3$) catalyst of the invention is capable of advancing hydrodeoxygenation and hydroisomerization of vegetable-animal-algae oils (i.e., triglycerides-containing starting materials), either in two successive steps (hydrodeoxygenation followed by hydroisomerization in serially placed reactors) or via one step (simultaneous hydrodeoxygenation and hydroisomerization in a single reactor), as described in US 2004/0230085 and U.S. Pat. No. 8,142,527, respectively.

Thus, the invention also provides a process for producing a liquid fuel composition, which process comprises hydroprocessing of a feedstock in the presence of the catalyst of the invention, wherein said feedstock comprises oxygen-containing compounds. More specifically, the invention relates to a process for producing a liquid fuel composition, comprising:

providing a feedstock oil selected from the group consisting of vegetable oil (e.g., soybean oil), animal oil, and mixtures thereof, and hydrodeoxygenating and hydroisomerizing the oil in the presence of the catalyst of the invention. It has been observed that the use of the catalyst of the invention also leads to formation of aromatics, affording aromatic jet fuel with acceptable content of aromatic compounds. A preferred embodiment of the process according to the invention includes the following steps:

(i) hydrodeoxygenating, hydroisomerizing and aromatizing a feedstock oil in the presence of the aforementioned Pt/(SAPO-11+$Al_2O_3$) catalyst, to obtain a gas-liquid mixture, wherein the gaseous component of said mixture comprises unreacted hydrogen and light hydrocarbons and the liquid component of said mixture comprises water and an organic liquid;

(ii) separating said gaseous component from said liquid component;

(iii) separating said liquid component into an organic and aqueous phases, and collecting at least said organic phase; and (v) optionally subjecting said organic phase, or a fraction thereof, to mild hydrocracking and successive isomerization in the presence of hydrogen and one or more catalysts.

According to a preferred process schematically illustrated in FIG. 4A, hydrodeoxygenation and hydroisomerization reactions occur simultaneously in a single reactor with a suitable configuration, for example, in a fixed-bed reactor (1) packed with particles of solid Pt/(SAPO-11+$Al_2O_3$) catalyst of the invention. The catalyst is typically employed in a granular form. Feedstock stream (10), e.g., a stream consisting of vegetable and/or animal oil, and hydrogen stream (20) are fed to the reactor (1). The temperature in the reactor is in the range from 360° C. to 420° C., preferably from 370 to 380° C. The pressure varies in the range from 30 to 50, preferably 30 to 35 atm. The hydrogen/oil feedstock ratio is from 400 to 800, preferably from 500 to 700 NL/L. The reaction is carried out at liquid hourly space velocity (LHSV) in the range of 0.5 to 5 $h^{-1}$, preferably 0.9 to 1.2 $h^{-1}$. The fluid discharged (50) from the reactor consists of a liquid-gas mixture and is separated in a gas-liquid separator (2), e.g., high pressure separator (2) into a liquid stream (60) and a gaseous stream (70). The former consists of a mixture of water and organics, whereas the latter comprises unreacted hydrogen, $CO_2$, CO and light products, mainly $C_1$ to $C_3$ hydrocarbons. Hydrogen recovered from stream (70), e.g., with the aid of selective membranes, is recycled (40) to the reactor. Therefore, hydrogen stream (20) supplied to the reactor is either fresh hydrogen (30), or recycled hydrogen (40), or a combined stream of both. Stream (80) indicates the light components remaining following $H_2$ separation and recycling.

The liquid stream (60) flows to a separator (3), where it is separated into an organic phase (100) and an aqueous phase (90). The upgrading of the organic phase (100), to meet the specification of diesel and jet fuels, takes place in a second reactor (4) using a series of two or more catalytic beds (A,B) to effect the hydrocracking step, converting oil fractions into lighter, more valuable products, and further isomerization. The organic phase (100) and hydrogen stream (20) are fed to the reactor (4). The first catalytic bed A consists of supported metal phosphide, such as supported nickel phosphide, e.g., $Ni_2P/(HY—Al_2O_3)$ catalyst containing water-sensitive zeolite HY which advances the hydrocracking step at relatively mild conditions, e.g., temperature from 300 to 340° C. Other water-sensitive catalysts useful for accomplishing hydrocracking in catalytic bed A include Pt/(HY—$Al_2O_3$), Pd/(HY—$Al_2O_3$) or Pt/(H-Beta-$Al_2O_3$). The second catalytic bed B consists of Pt/(SAPO-11+$Al_2O_3$), e.g., a catalyst of the invention, at higher temperature (from 320 to 360° C.), to achieve further isomerization and reduce the solidification point of the jet fuel product. Other process variables of the hydrocracking step are pressure from 30 to 50 atm, LHSV from 1 to 5 $h^{-1}$ and $H_2$/organic ratio from 300 to 800 NL/L. In another variant of the process (not shown), the organic phase (100) obtained from the first stage is fractionated to light naphtha (<130° C.), jet (135-260° C.) and heavy (>260° C.) fractions, and the heavy fraction undergo mild-hydrocracking in reactor (4) in order to increase the yield of jet fuel.

EXAMPLES

Figures 1, 2:
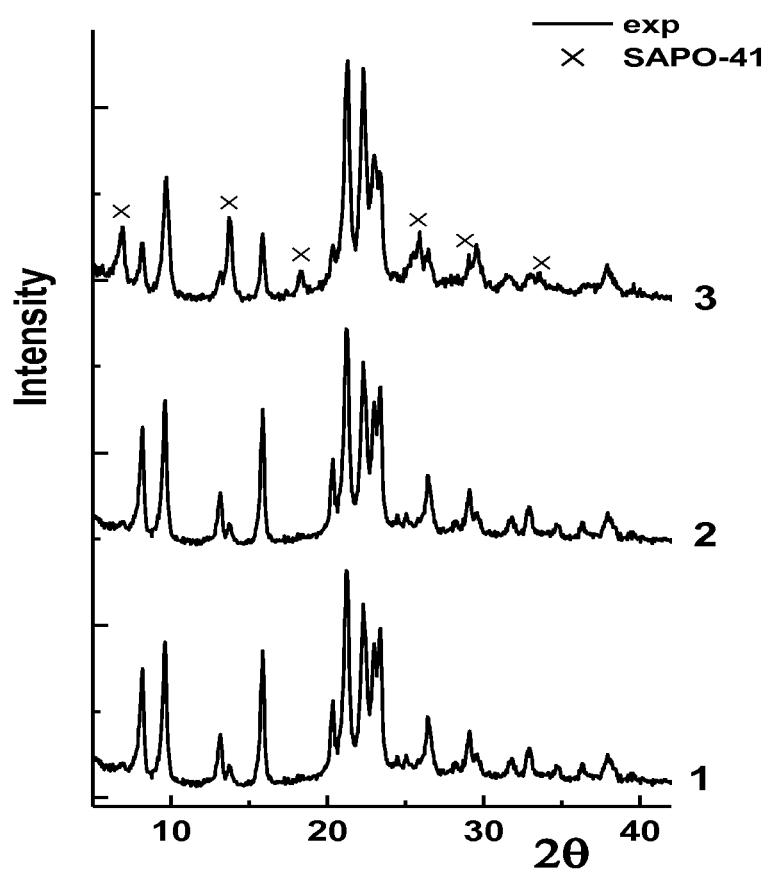
FIG. 1 schematically illustrates the local arrangement of Si atoms in SAPO-11 framework.
FIG. 2 shows XRD patterns of pure SAPO-11 materials synthesized according to Examples #1 (1), #5 (2) and #7 (3).

Methods
X-Ray Diffraction (XRD)

The X-ray diffraction (XRD) patterns were obtained with a Phillips 1050/70 powder diffractometer fitted with a graphite monochromator, at 40 kV and 28 mA. Software developed by Crystal Logic was used. The data were collected in a range of 2θ values between 5° and 80° with a step size of 0.05°. Phase identification was performed by using BEDE ZDS computer search/match program coupled with the ICDD (International Center for Diffraction Data) Powder Diffraction File database (2006). The relative content of SAPO-11, SAPO-41, APO-11 and amorphous phases represented in X-ray diffractograms by a wide reflection centered at 2θ=22° was obtained by Rietveld refinement of the XRD profile by using the DBWS-9807 program.

Surface Area and Pore Volume Measurements

Surface area and pore volume were derived from $N_2$ adsorption-desorption isotherms using conventional BET and BJH methods (Barrett-Joyner-Halenda method, Journal of American Chemical Society, 73, 373, 1951). The samples were degassed under vacuum at 250-70° C., depending on their thermal stability. Isotherms were measured at liquid nitrogen temperature with a NOVA-2000 Quantachrome, Version 7.02 instrument.

Energy Dispersive X-Ray Spectroscopy (EDAX)

The total elemental composition of catalysts was measured by EDAX method using Quanta-200, SEM-EDAX, FEI Co. instrument. The contents of Si, P and Al atoms in the SAPO-11 framework were calculated averaging the data obtained from five different points of the material crystals.

$^{29}$Si MAS NMR $^{29}$Si cross polarization (cp) MAS NMR spectra were acquired on Bruker Avance III 500 MHz spectrometer using a 4 mm VTN CPMAS probe, covering the necessary frequency range, using MAS at 8 kHz.

Example 1

(Comparative, Based on U.S. Pat. No. 6,294,081) SAPO-11 Prepared at HDA/Al$_2$O$_3$=0.29, 24 h Aluminum oxide-hydroxide AlOOH with pure pseudobohemite structure and crystal size of 4.5 nm was used as alumina source. 24.5 g water, 26.0 g phosphoric acid (85%, Sigma Aldrich) and 22.0 g pseudobohemite (73% Al$_2$O$_3$, crystal size 4.5 nm; Disperal P2, Sasol Ltd., Germany) were stirred together for h. 13.4 g DPA (Sigma Aldrich) was added and the gel was stirred for 2 h. 59.4 g hexanol (Sigma Aldrich) and 10.4 g hexadecylamine (Fluka) were stirred in a separate vessel for about 30 min, following which 24.5 g water was added and stirred together for 5 min, and then added to the reaction mixture. This was followed by addition of 13.8 g TEOS (tetraethylorthosilicate) and 24.5 g water. The final gel was stirred for another 2 h reaching the final pH of 4.7. The weight ratio between three portions of water added at three different steps of preparation of crystallization gel was 1:1:1. The gel containing Al$_2$O$_3$:P$_2$O$_5$:DPA: 0.5TEOS:0.288 hexadecylamine:4.4 hexanol:35H$_2$O was introduced into a Teflon-coated 350 cm$^3$ autoclave and heated statically for 24 h at 195° C. (heating rate 2° C./min). Then the mixture was quenched to room temperature, centrifuged and washed several times with ethanol and water with interim and final centrifugations. The recovered white powder was dried at 40° C. overnight and then calcined in nitrogen flow (130 ml/min) for 1 h at 550° C. (heating rate 2° C./min) followed by calcination in an air flow (130 ml/min) for additional 2 h. The calcined material did not contain other phases besides silicoaluminophosphate SAPO-11 (XRD, FIG. 2, pattern no. 1) and its framework included Si, Al and P in atomic ratio of Si:P:Al=0.30:0.74:1.0 corresponding to Si content of 6.9 wt. % (EDAX).

The total surface area of calcined SAPO-11 material 187 m$^2$/g, external surface area 60 m$^2$/g, micropore volume 0.025 cm$^3$/g and mesopore volume 0.235 cm$^3$/g. The Pt/SAPO-11-Al$_2$O$_3$ catalysts pellets were prepared by combining of SAPO-11 zeolite with alumina binder. For this purpose the same pseudobohemite powder used for zeolite synthesis was mixed with the powder of obtained zeolitic material at weight ratio corresponding to SAPO-11/Al$_2$O$_3$=9/1, homogenized in a ball mill for 10 min and peptized with an aqueous solution of Al(NO$_3$)$_3$ salt (Riedel de Haen) reaching the rheological characteristics suitable for its forming by extrusion. After drying at 120° C. for 2 h and calcination in air at 500° C. for 2 h, the extrudates having diameter of 1.5 mm were cut into pellets of 6.5-7.5 mm length. Platinum (1 wt %) was loaded into these extrudates by incipient wetness impregnation with H$_2$PtCl$_6$ aqueous solution. The Pt-loaded extrudates were dried at room temperature for 15 h, then at 110° C. for 3 h and calcined according to following program: 180° C.:1° C./min, 300° C.:1° C./min for 3 h, 400° C.:1° C./min for 2 h and 500° C.:1° C./min for 2 h. The final catalyst pellets were reduced in a tubular reactor in H$_2$ flow of 250 cm$^3$/min at temperature of 300° C. for 16 h.

Example 2

(Comparative, Based on U.S. Pat. No. 4,310,440 and U.S. Pat. No. 4,440,871) SAPO-11 without Surfactant The catalyst was prepared according to Example 1 but with no addition of hexadecyl-amine and hexanol at the preparation of crystallization gel, while water was added only in two portions of 24.5 g excluding the second portion. The gel composition was Al$_2$O$_3$: P$_2$O$_5$:DPA:0.5TEOS: 23.5H$_2$O. The calcined material did not contain other phases besides silico-alumino-phosphate SAPO-(XRD) and its framework included Si, Al and P in atomic ratio of Si:P:Al=0.19:0.80:1.0, corresponding to Si content 4.5 wt. % (EDAX). The total surface area of calcined SAPO-11 material was 150 m$^2$/g, external surface area 45 m$^2$/g, micropore volume 0.025 cm$^3$/g and mesopore volume 0.096 cm$^3$/g.

Example 3

(Comparative, Based on U.S. Pat. No. 6,294,081) SAPO-11 Prepared at HDA/Al$_2$O$_3$=0.5; 24 h The catalyst was prepared according to Example 1, but the amount of added hexadecylamine for preparation of crystallization gel was 18.0 gram corresponding to HDA/Al$_2$O$_3$ molar ratio of 0.50. The gel composition was Al$_2$O$_3$:P$_2$O$_5$: DPA:0.5TEOS:0.50 hexadecylamine:4.4 hexanol:35H$_2$O. The calcined material did not contain other phases besides silicoaluminophosphate SAPO-11 (XRD) and its framework included Si, Al and P in atomic ratio of Si:P:Al=0.24:0.79:1.0 corresponding to Si content 5.5 wt. % (EDAX). The total surface area of calcined SAPO-11 material was 219 m$^2$/g, external surface area 189 m$^2$/g, micropore volume 0.028 cm$^3$/g and mesopore volume 0.252 cm$^3$/g.

Example 4

SAPO-11 Prepared at HDA/Al$_2$O$_3$=0.55; 24 h

The catalyst was prepared according to Example 1 but the amount of added hexadecylamine for preparation of crystallization gel was 20.0 gram corresponding to HDA/Al$_2$O$_3$ molar ratio of 0.55, and the amount of water combined with the hexanol and hexadecylamine was 12.25 g. The gel composition was Al$_2$O$_3$:P$_2$O$_5$:DPA:0.5TEOS:0.55 hexadecylamine:4.4 hexanol:35H$_2$O. The calcined material did not contain other phases besides silicoaluminophosphate SAPO-11 and its framework included Si, Al and P in atomic ratio of Si:P:Al=0.31:0.74:1.0 corresponding to Si content 7.0 wt. % (EDAX). The total surface area of calcined SAPO-11 material was 228 m$^2$/g, external surface area 190 m$^2$/g, micropore volume 0.024 cm$^3$/g and mesopore volume 0.240 cm$^3$/g.

Example 5

SAPO-11 Prepared at HDA/Al$_2$O$_3$=0.58; 24 h

The catalyst was prepared according to Example 1 but the amount of added hexadecylamine for preparation of crystallization gel was 21.0 g corresponding to HDA/Al$_2$O$_3$ molar ratio of 0.58, and the amount of water combined with the hexanol and hexadecylamine was 12.25 g. The gel composition was $Al_2O_3$: $P_2O_5$:DPA:0.5TEOS:0.58 hexadecylamine:4.4 hexanol:35$H_2O$. The calcined material did not contain other phases besides silicoaluminophosphate SAPO-11 (XRD, FIG. 2, pattern no. 2) and its framework included Si, Al and P in atomic ratio of Si:P:Al=0.31:0.72:1.0 corresponding to Si content 7.2 wt. % (EDAX). The total surface area of calcined SAPO-11 material was 240 $m^2$/g, external surface area 205 $m^2$/g, micropore volume 0.035 $cm^3$/g and mesopore volume 0.205 $cm^3$/g.

Example 6

SAPO-11 Prepared at $HDA/Al_2O_3$=0.65; 24 h

The catalyst was prepared according to Example 1 but the amount of added hexadecylamine for preparation of crystallization gel was 23.5 g corresponding to $HDA/Al_2O_3$ molar ratio of 0.65, and the amount of water combined with the hexanol and hexadecylamine was 12.25 g. The gel composition was $Al_2O_3$: $P_2O_5$:DPA:0.5TEOS:0.65 hexadecylamine:4.4 hexanol:35$H_2O$. The calcined contained two zeolitic phases—90 wt. % SAPO-11 and 10 wt. % SAPO-41. Its framework included Si, Al and P in atomic ratio of Si:P:Al=0.33:0.72:1.0 corresponding to Si content 7.6 wt. % (EDAX). The total surface area of calcined SAPO-11 material was 285 $m^2$/g, external surface area 239 $m^2$/g, micropore volume 0.033 $cm^3$/g and mesopore volume 0.282 $cm^3$/g.

Example 7

(Comparative) SAPO-11 Prepared at $HDA/Al_2O_3$=0.72; 24 h

The catalyst was prepared according to Example 1 but the amount of added hexadecylamine for preparation of crystallization gel was 26.2 g corresponding to $HDA/Al_2O_3$ molar ratio of 0.72, and the amount of water combined with the hexanol and hexadecylamine was 12.25 g. The gel composition was $Al_2O_3$: $P_2O_5$:DPA:0.5TEOS:0.72 hexadecylamine:4.4 hexanol:35$H_2O$. The calcined material contained two zeolitic phases—50 wt. % SAPO-11 and 50 wt. % SAPO-41 (FIG. 2, pattern no. 3). Its framework included Si, Al and P in atomic ratio of Si:P:Al=0.40:0.72:1.0 corresponding to Si content 8.9 wt. % (EDAX). The total surface area of calcined SAPO-11 material was 272 $m^2$/g, external surface area 235 $m^2$/g, micropore volume 0.018 $cm^3$/g and mesopore volume 0.281 $cm^3$/g.

Example 8

SAPO-11 Prepared at $HDA/Al_2O_3$=0.58, 48 h

The catalyst was prepared according to Example 5 but the crystallization time of the gel in preparation of SAPO-11 material was 48 h. The calcined material did not contain other phases besides silicoaluminophosphate SAPO-11 (XRD) and its framework included Si, Al and P in atomic ratio of Si:P:Al=0.31:0.73:1.0 corresponding to Si content 7.1 wt. % (EDAX). The total surface area of calcined SAPO-11 material was 264 $m^2$/g, external surface area 241 $m^2$/g, micropore volume 0.012 $cm^3$/g and mesopore volume 0.266 $cm^3$/g.

Example 9

SAPO-11 Prepared at $HDA/Al_2O_3$=0.58, 72 h

The catalyst was prepared according to Example 5 but the crystallization time of the gel in preparation of SAPO-11 material was 72 h. The calcined material did not contain other phases besides silicoaluminophosphate SAPO-11 (XRD) and its framework included Si, Al and P in atomic ratio of Si:P:Al=0.3:0.71:1.0 corresponding to Si content 7.0 wt. % (EDAX). The total surface area of calcined SAPO-11 material was 266 $m^2$/g, external surface area 240 $m^2$/g, micropore volume 0.013 $cm^3$/g and mesopore volume 0.192 $cm^3$/g.

Example 10

SAPO-11 Prepared at $HDA/Al_2O_3$=0.58, 96 h

The catalyst was prepared according to Example 5 but the crystallization time of the gel in preparation of SAPO-11 material was 96 h. The calcined material did not contain other phases besides silicoaluminophosphate SAPO-11 (XRD) and its framework included Si, Al and P in atomic ratio of Si:P:Al=0.3:0.71:1.0 corresponding to Si content 7.0 wt. % (EDAX). The total surface area of calcined SAPO-11 material was 264 $m^2$/g, external surface area 214 $m^2$/g, micropore volume 0.025 $cm^3$/g and mesopore volume 0.181 $cm^3$/g.

Example 11

SAPO-11 Prepared at $HDA/Al_2O_3$=0.58 24 h; 0.5% Pt in SAPO-11, 1% Pt in $Al_2O_3$ The catalyst prepared according to Example 5, but the platinum loading was done in two steps. The first portion of 0.5 wt % was loaded directly on SAPO-11 powder by incipient wetness impregnation with aqueous $H_2PtCl_6$ solution followed by calcination and Pt reduction. Additional 1% of Pt was loaded on extrudates of SAPO-11/0.5% Pt+10% $Al_2O_3$ and reduced as described in Example 5.

Figure 3A:
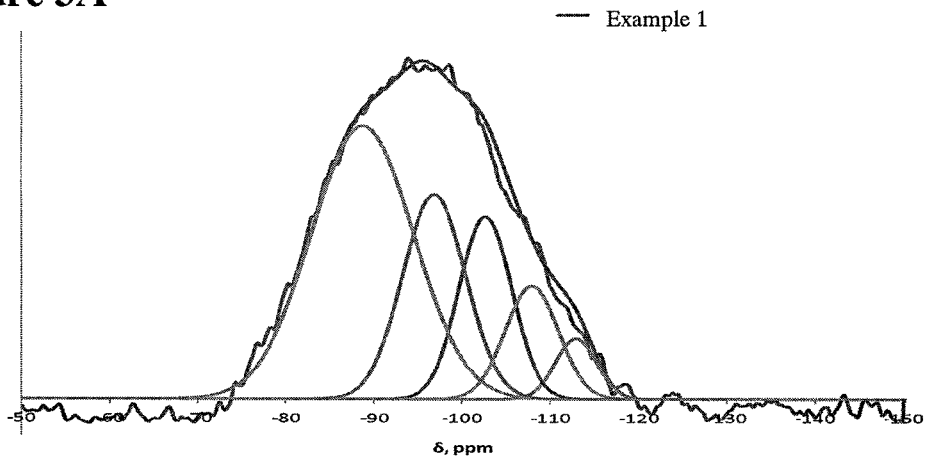
FIGS. 3A, 3B and 3C show the $^{29}$Si MAS NMR spectra of catalysts of Examples 1, 3 and 5, respectively.
Figure 3B:
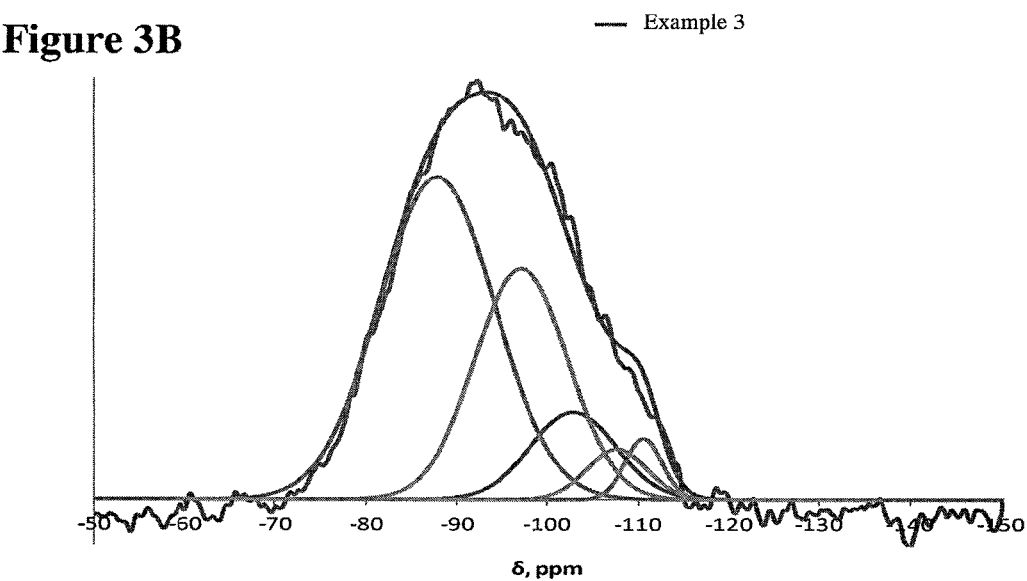
Figure 3C:
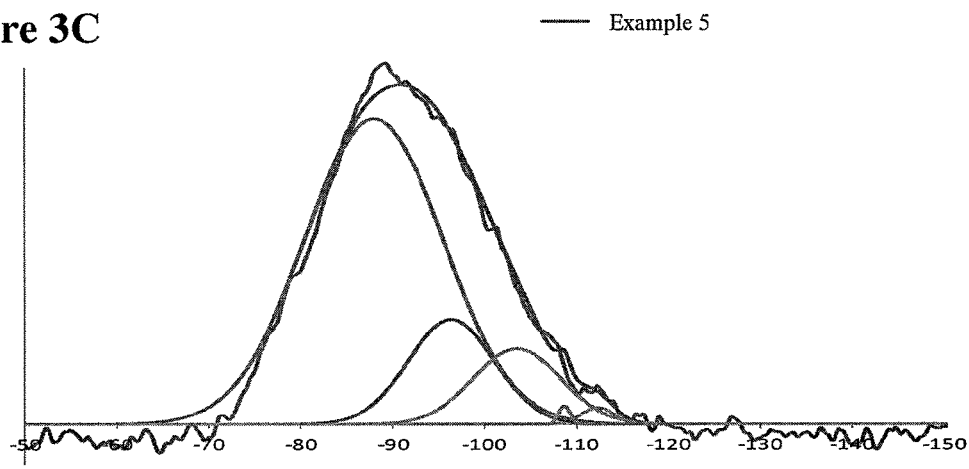

The distributions of silicon atoms among possible silicon sites in some of the SAPO-11 materials prepared in the foregoing examples and derived from $^{29}$Si-NMR spectra shown in FIGS. 3A, 3B and 3C are tabulated in Table 1.

TABLE 1

| Si Environment | 4Al, 0Si | 3Al, 1Si | 2Al, 2Si | 1Al, 3 Si | 0Al, 4 Si |
|---|---|---|---|---|---|
| Chemical shift in ppm according to $^{29}$Si NMR spectra | −89 to −91 | −97 | −103 | −108 | −110 to −113 |
| Example 1 (comparative) | 47.3 | 22.1 | 16.2 | 10.2 | 4.2 |
| Example 3 (comparative) | 52.0 | 30.1 | 10.5 | 4.3 | 3.1 |
| Example 5 | 71.8 | 15.5 | 11.4 | 0.4 | 0.9 |

Example 12

Figure 4A:
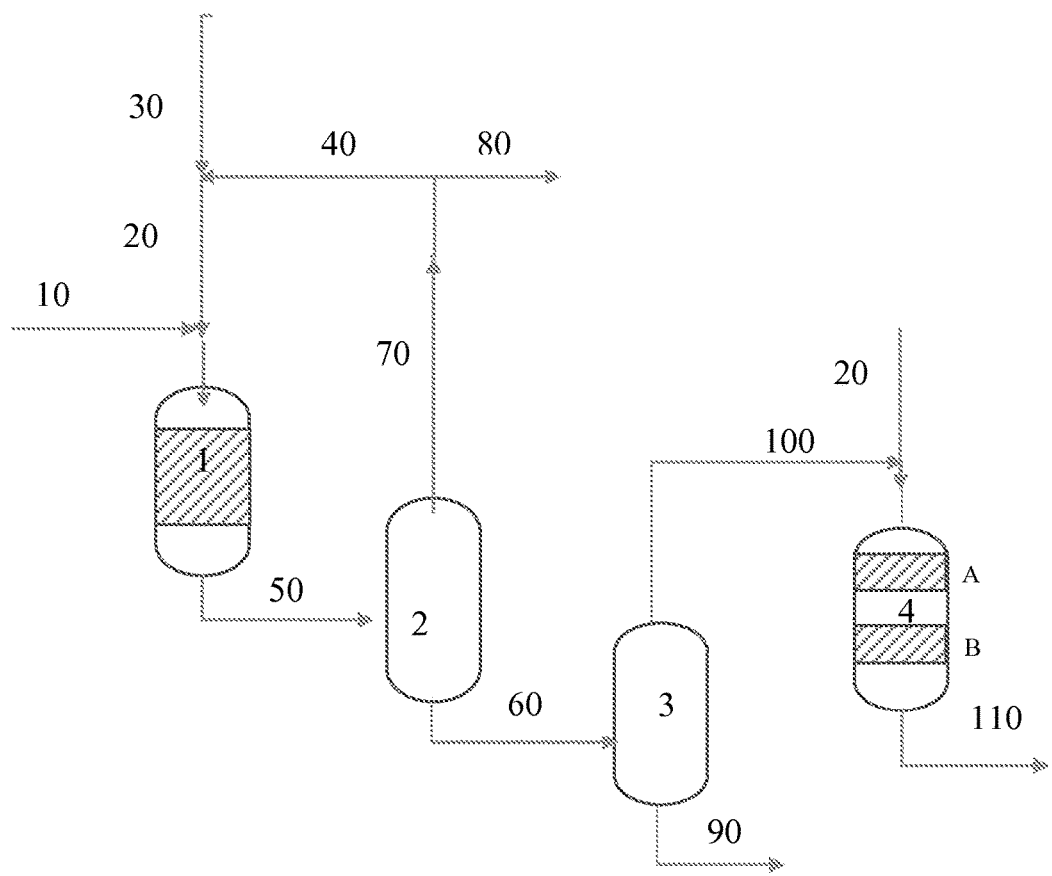
FIG. 4A schematically illustrates an apparatus for conducting hydrodeoxygenation reaction employing SAPO-11 of the invention.
Figure 4B:
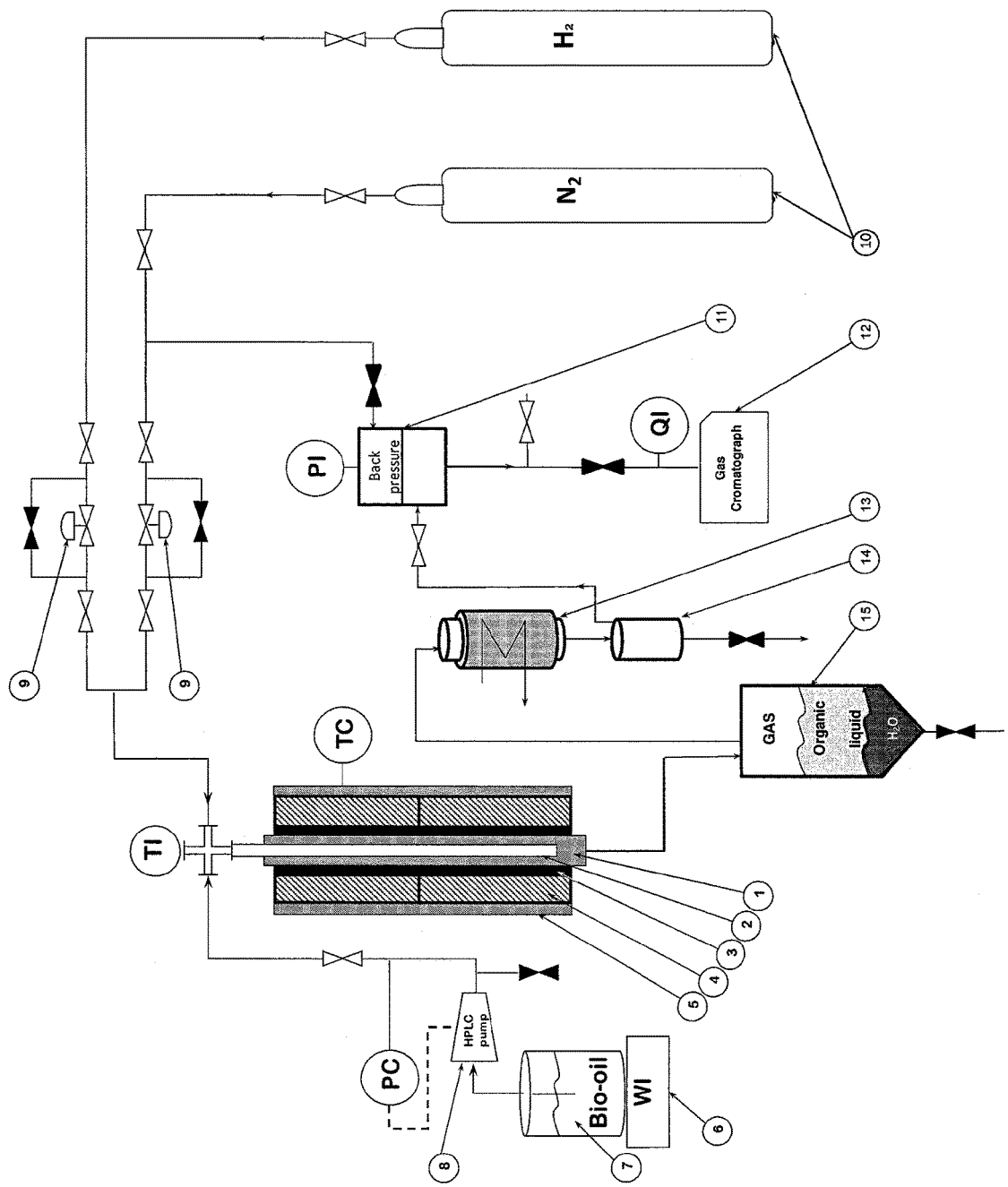
FIG. 4B displays the experimental setup for catalysts testing: (1) packed reactor, (2) thermowell, (3) heat dispersion mantle, (4) heating jacket, (5) thermal insulation, (6) balance, (7) feed tank, (8) high pressure pump, (9) Brooks flow meter controller, (10) high pressure cylinders, (11) back pressure regulator, (12) GC (13) cooler, (14) low-temperature gas-liquid separator, and (15) high temperature gas-liquid separator.

The catalysts prepared according to Examples 1-11 were tested in hydrotreating of soybean oil (Miloumor) containing <0.1% free fatty acids in an experimental rig equipped with a fixed-bed reactor (a scheme of the experimental set-up is shown in FIG. 4B). The bench-scale reactor consisted of a 1.1-cm ID and 45-cm long, stainless-steel, electrically heated tube and contained 20-40 cm$^3$ of pelletized catalyst mixed with 10-20 cm$^3$ of 300-500-µm SiC inert particles. The bench-scale system was equipped with a feed tank, gas cylinders, a high-pressure gas-liquid separator, Brooks mass flow meters and high pressure. The system pressure was maintained by a back-pressure regulator. Temperature and pressure controllers and proper safety instrumentation ensured safe operation of the system.

The catalysts were tested in continuous runs at 30 atm, 370° C., LHSV=1 h$^{-1}$ and H$_2$/oil ratio at the reactor inlet 700 NL/L. The products density, cloud point, aromatics content and total acidity were measured after periods of run according to ASTM D1217, ASTM D2500, ASTM D6379 and ASTM D3242.

The testing results obtained after 200 h of run are presented in Table 2.

TABLE 2

Testing results in hydrotreating of soybean oil

| Catalyst according to example # | Aromatic content (%) ASTM D6379 | Total acidity (mgKOH/g) ASTM D3242 | Cloud point (° C.) ASTM D2500 | Density (g/cm$^3$) ASTM D1217 | Organic liquid yield (%) |
|---|---|---|---|---|---|
| 1 (comparative) | 16 | 0.15 | −20 | 0.811 | 84 |
| 2 (comparative) | 14 | 0.04 | −5 | 0.784 | 83 |
| 3 (comparative) | 15 | 0.30 | −22 | 0.797 | 83 |
| 4 (of the invention) | 14 | 0.20 | −23 | 0.798 | 83 |
| 5 (of the invention) | 15 | 0.12 | −33 | 0.807 | 84 |
| 8 (of the invention) | 14 | 0.03 | −37 | 0.794 | 83 |
| 9 (of the invention) | 14 | 0.04 | −40 | 0.791 | 82 |
| 10 (of the invention) | 14 | 0.03 | −42 | 0.791 | 83 |
| 11 (of the invention) | 12 | 0.02 | −30 | 0.794 | 83 |

The results indicate that after 200 h on stream, the catalysts prepared according to the present invention (Examples 4-5 and 8-11) displayed higher isomerization activity of normal hydrocarbons produced through hydrodeoxygenation of triglycerides of the vegetable oil. This is indicated by the low cloud point (below −30° C. during a 200 h run) of the products formed with the aid of the catalysts of the invention.

Figure 5A:
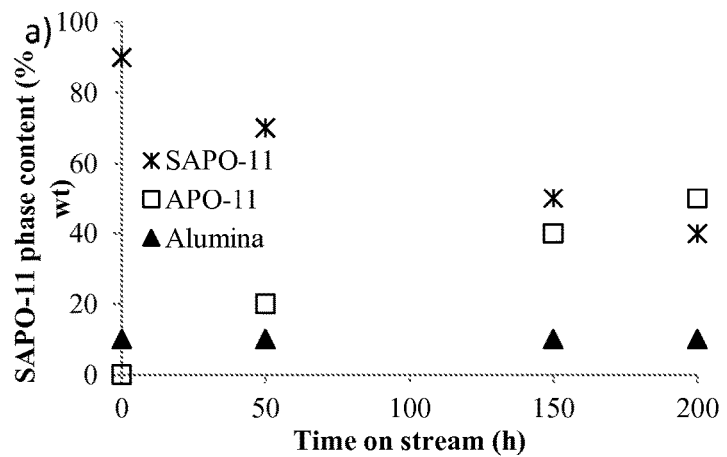
FIGS. 5A, 5B and 5C illustrate variations of SAPO-11 component phase content in 1 wt. % Pt/(SAPO-11+10% $Al_2O_3$) catalyst with time on stream in catalytic runs of hydrotreating of soybean oil with catalysts synthesized according to Examples #1 (FIG. 5A), #2 (FIG. 5B) and #5 (FIG. 5C).
Figure 5B:
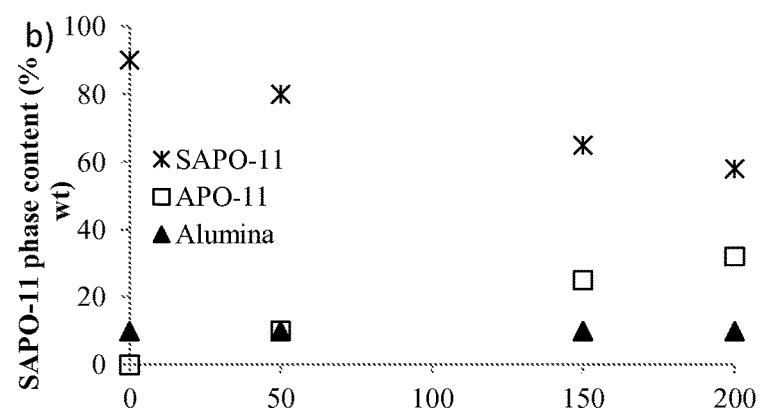
Figure 5C:
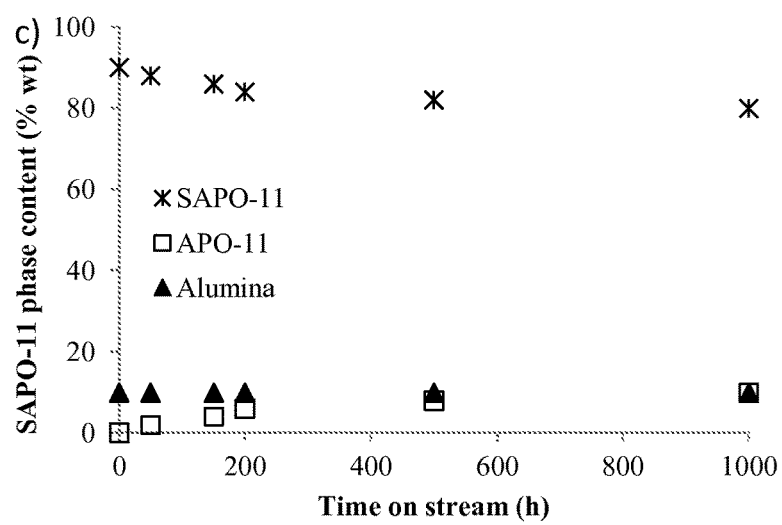

The improved stability of the catalyst of the invention is further illustrated in the graphs shown in FIG. 5. The variation of the SAPO-11 content in the catalysts of Examples 1, 3 and 5 with time on stream was measured and the results are graphically presented in FIGS. 5a, 5b and 5c, respectively. The content of the SAPO-11 component in the comparative catalysts of Examples 1 and 3 decreases sharply with time on stream. This is due to the desilication of SAPO-11 framework of comparative catalysts at hydrothermal conditions, leading to the formation of crystalline aluminophosphate APO-11 and amorphous silica phases. In contrast, the content of SAPO-11 phase in the catalyst prepared according to the present invention (Example 5) is stable during the catalytic run for a period of 1000 h (see FIG. 5c).

Figure 6:
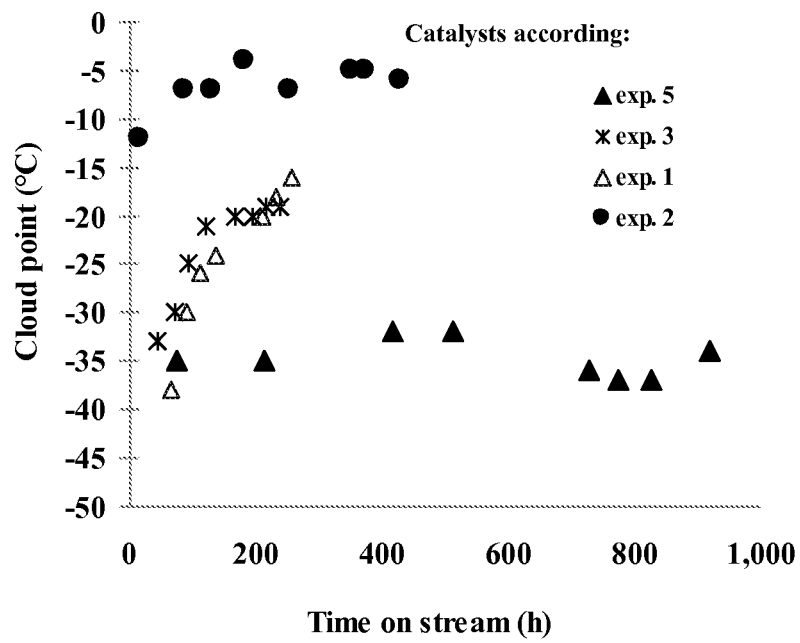
FIG. 6 shows variations of the pour point of the hydrotreating product of soybean oil obtained in testing the catalyst as a function of time on stream: catalyst according to examples #1-3 and 5.

In the graph shown in FIG. 6, the cloud points of liquid products obtained with the aid of several catalysts were measured periodically during a run of 1000 hours, and the results are plotted against the time on stream. The catalyst of Example 5 (marked in the graph with black triangles) leads to formation of products displaying cloud points lower than −30° C., from the very beginning of run, all the way around to the end of the run. In contrast, the cloud point of the hydrocarbon products obtained with the catalysts of Examples #1 and 3 rises steeply with time (marked in the graph with empty triangles and X, respectively). It is also noted that the performance of the catalyst of Example 2 (black circles) is especially poor.

The deoxygenation extent of the vegetable oil in all cases exceeds 99% yielding low acidity of <0.5 mgKOH/g. The product contains 10-20% aromatic hydrocarbons and has density of 0.790-0.810 g/cm$^3$. So, the liquid product obtained with catalyst according to the present invention is an excellent feedstock for production of diesel and jet fuels in long continuous runs conducted in trickle-bed reactors.

Example 13

Production of Aromatic Jet Fuel from Soybean Oil

Refined soybean oil was fed to a fixed-bed reactor with a granulated 1% Pt/(SAPO-11+Al$_2$O$_3$) catalyst of Example 5 at LHSV=1.0 h$^{-1}$, T=370-385° C., P=30 atm and H$_2$/oil ratio=700 NL/L. The run was carried out for >1000 h. The gas phase contained, besides hydrogen, CO$_2$, CO and light products, mainly C$_1$ to C$_3$ hydrocarbons. The total liquid flow was separated into two phases, water and organics.

To improve the properties and increase yield of jet fuel fraction, the organic liquid obtained from the first stage was subjected to mild hydrocracking step. The liquid was fed to a fixed-bed reactor with two catalytic layers: (1) Ni$_2$P/HY catalyst as mild hydrocracking step at 315° C. and (2) the catalyst of Example 5 at 350° C. Each layer was functioned under LHSV=4.0 h$^{-1}$, 30 atm and H$_2$/oil ratio=600 NL/L. The run was carried out for >100 h. The gas phase contained, besides hydrogen, other light products, mainly C$_1$ to C$_4$ hydrocarbons. Yield (based on oil feedstock) and properties of the jet fuel fraction collected are set out in Table 3.

TABLE 3

| Property | Method (ASTM) | Limits | Jet fuel |
|---|---|---|---|
| Yield of fraction to oil, wt % | | | 58 |
| Acidity, total mg KOH/g | D3242 | 0.10 | 0.010 |
| Aromatics, vol % | D1319 | 8-25 | 8.2 |
| Distillation temperature, ° C.: | D86 | | |
| Initial boiling point, ° C. | | Max. 205 | 132 |
| 10% recovered, | | report | 143 |
| 20% recovered, | | report | 160 |
| 30% recovered, | | report | 175 |
| 40% recovered, | | report | 175 |
| 50% recovered, | | report | 190 |
| 60% recovered, | | report | 207 |
| 70% recovered, | | report | 225 |
| 80% recovered, | | report | 244 |
| 90% recovered, | | report | 280 |
| Final boiling point,, ° C. | | Max. 300 | 289 |
| T50-T10, ° C. | | Min. 15 | 47 |
| T90-T10, ° C. | | Min. 40 | 137 |
| Distillation residue, % | | Max. 1.5 | 1.5 |
| Distillation loss, % | | Max. 1.5 | 1.1 |
| Flash point, ° C. | D56 | Min. 38 | 44 |
| Density at 15° C., kg/m$^3$ | D1298 | 0.775-0.840 | 0.780 |
| Freezing point, ° C. | D2386 | Max. −47 | −50 |

TABLE 3-continued

| Property | Method (ASTM) | Limits | Jet fuel |
|---|---|---|---|
| Viscosity −20° C., mm2/s | D445 | Max. 8 | 4.58 |
| Existent gum, mg/100 mL | D381 | Max. 7 | 1 |

Figure 7:
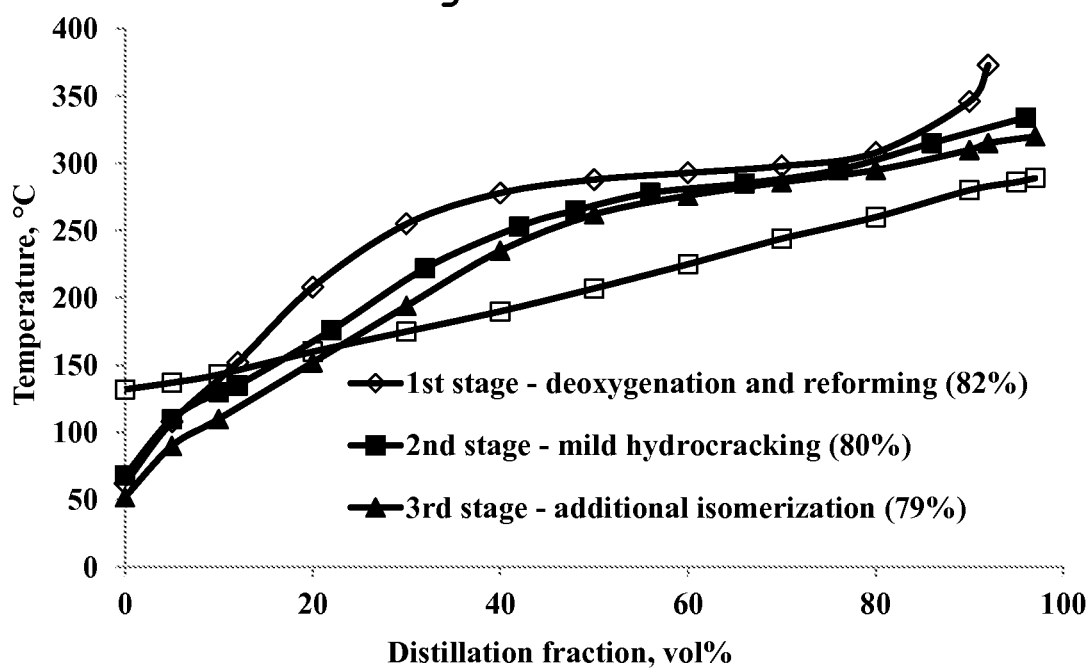
FIG. 7 shows distillation curves of jet fuel fraction formed from soybean oil with the aid of SAPO-11 of the invention.

FIG. 7 shows distillation curves of organic products from the 1st step (i.e., the product of the simultaneous hydrodeoxygenation and hydroisomerization of a refined soybean oil; indicated by empty rhombuses), the 2nd step (i.e., the product of the mild hydrocraking step; indicated by solid squares), the final product (obtained by additional isomerization step; indicated by solid triangles) and the biojet product obtained after distillation (marked by the empty squares).

Example 14

Production of Aromatic Jet Fuel from Soybean Oil

Refined soybean oil was fed to a fixed-bed reactor with a granulated 1% Pt/(SAPO-11+Al$_2$O$_3$) catalyst of Example 5 at LHSV=1.0 h$^{-1}$, 370-385° C., 30 atm and H$_2$/oil ratio=600 NL/L. The run was carried out for >1000 h. The gas phase contained, besides hydrogen, other light products, mainly C$_1$ to C$_3$ hydrocarbons. The total liquid flow was separated into two phases, water and organics.

To improve the properties of the jet fuel fraction, the organic liquid obtained from the first stage was passed fractionation to light naphtha (<130° C.), jet (135-260° C.) and heavy (>260° C.) fractions. The heavy fraction was passed mild-hydrocracking over Ni$_2$P/HY at 315° C. and then additional isomerization over the catalyst of Example 5 at 350° C., LHSV=4.0 h$^{-1}$, 30 atm and H$_2$/oil ratio=700 NL/L, respectively. The run was carried out for >100 h. The gas phase contained, besides hydrogen, other light products, mainly C1 to C4 hydrocarbons. Yield (based on the oil feedstock) and properties of the jet fuel fraction collected are set out in Table 4.

TABLE 4

| Property | Method | Limits | Jet fuel |
|---|---|---|---|
| Yield of fraction to oil, wt % | | | 69 |
| Acidity, total mg KOH/g | D3242 | 0.10 | 0.010 |
| Aromatics, vol % | D1319 | 8-25 | 8.4 |
| Distillation temperature, ° C.: | D86 | | |
| Initial boiling point, ° C. | | Max. 205 | 140 |
| 10% recovered, | | report | 185 |
| 20% recovered, | | report | 215 |
| 30% recovered, | | report | 235 |
| 40% recovered, | | report | 255 |
| 50% recovered, | | report | 263 |
| 60% recovered, | | report | 271 |
| 70% recovered, | | report | 276 |
| 80% recovered, | | report | 280 |
| 90% recovered, | | report | 282 |
| T50-T10, ° C. | | Min. 15 | 123 |
| T90-T10, ° C. | | Min. 40 | 142 |
| Final boiling point,, ° C. | | Max. 300 | 300 |
| Distillation residue, % | | Max. 1.5 | 1.2 |
| Distillation loss, % | | Max. 1.5 | 0.8 |
| Flash point, ° C. | D56 | Min. 38 | 48.5 |
| Density at 15° C., kg/m$^3$ | D1298 | 0.775-0.840 | 0.776 |
| Freezing point, ° C. | D2386 | Max. −47 | −50 |
| Viscosity −20° C., mm2/s | D445 | Max. 8 | 3.3 |
| Existent gum, mg/100 mL | D381 | Max. 7 | 1 |

Figure 8:
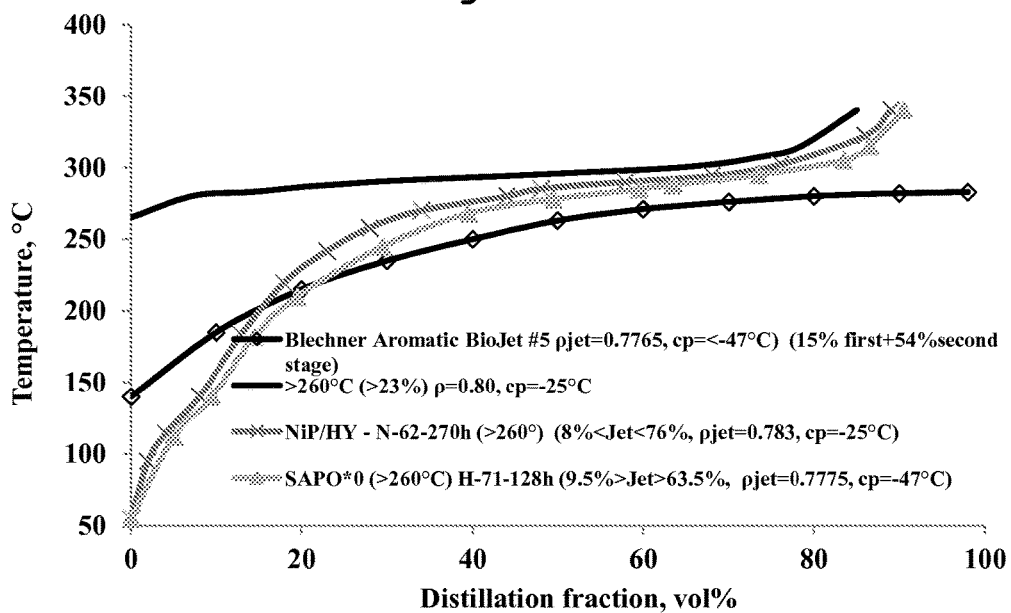
FIG. 8 shows distillation curves of jet fuel fraction formed from soybean oil with the aid of SAPO-11 of the invention.

FIG. 8 shows distillation curves of the organic products from the 1st step (i.e., the product of the simultaneous hydrodeoxygenation and hydroisomerization of the refined soybean oil; indicated by the solid triangles), the heavy fraction above 260° C. (indicated by the upper smooth curve), the mild hydrocracking product (indicated by crosses), additional isomerization product and the final aromatic BioJet product (indicated by rhombuses).

Example 15

Production of Paraffinic Jet Fuel from Soybean Oil

Refined soybean oil was fed to a fixed-bed reactor with a granulated Ni$_2$P/SiO$_2$ catalyst at LHSV=1.0 h$^{-1}$, 330-370° C., 30 atm and H$_2$/oil ratio=1000 NL/L. The run was carried out for >1000 h. The gas phase contained, besides hydrogen, other light products, mainly C$_1$ to C$_3$ hydrocarbons. The total liquid flow was separated into two phases, water and organics.

To enrich the distillation range and properties of jet fuel, the organic normal paraffinic liquid obtained from the first stage was subjected to mild hydrockracking and isomerization steps. The liquid was fed to a fixed-bed reactor with two catalytic layers: (1) Ni$_2$P/HY catalyst as mild hydrocracking step at 325° C. and (2) 1% Pt/(SAPO-11+Al$_2$O$_2$) of Example 5 at 350° C. Each layer was functioned under LHSV=4.0 h$^{-1}$, 30 atm and H$_2$/oil ratio=350 NL/L. The run was carried out for >100 h. The gas phase contained, besides hydrogen, other light products, mainly C$_1$ to C$_4$ hydrocarbons. Yield (based on oil feedstock) and properties of the jet fuel paraffinic fraction collected are set out in Table 5.

TABLE 5

| Property | Method | Limits | Jet fuel |
|---|---|---|---|
| Yield of fraction to oil, wt % | | | 56 |
| Acidity, total mg KOH/g | D3242 | 0.015 | 0.010 |
| Aromatics, vol % | D1319 | Max. 0.5 | 0.0 |
| Distillation temperature, ° C.: | D86 | | |
| Initial boiling point, ° C. | | Max. 205 | 142 |
| 10% recovered, | | report | 178 |
| 20% recovered, | | report | 194 |
| 30% recovered, | | report | 216 |
| 40% recovered, | | report | 235 |
| 50% recovered, | | report | 250 |
| 60% recovered, | | report | 262 |
| 70% recovered, | | report | 269 |
| 80% recovered, | | report | 274 |
| 90% recovered, | | report | 278 |
| T50-T10, ° C. | | Min. 22 | 72 |
| Final boiling point,, ° C. | | Max. 300 | 280 |
| Distillation residue, % | | Max. 1.5 | 1.5 |
| Distillation loss, % | | Max. 1.5 | 1 |
| Flash point, ° C. | D56 | Min. 38 | 46 |
| Density at 15° C., kg/m$^3$ | D1298 | 0.775-0.840 | 0.766 |
| Freezing point, ° C. | D2386 | Max. −47 | −55 |
| Viscosity −20° C., mm2/s | D445 | Max. 8 | 7.62 |
| Existent gum, mg/100 mL | D381 | Max. 7 | 3 |

Figure 9:
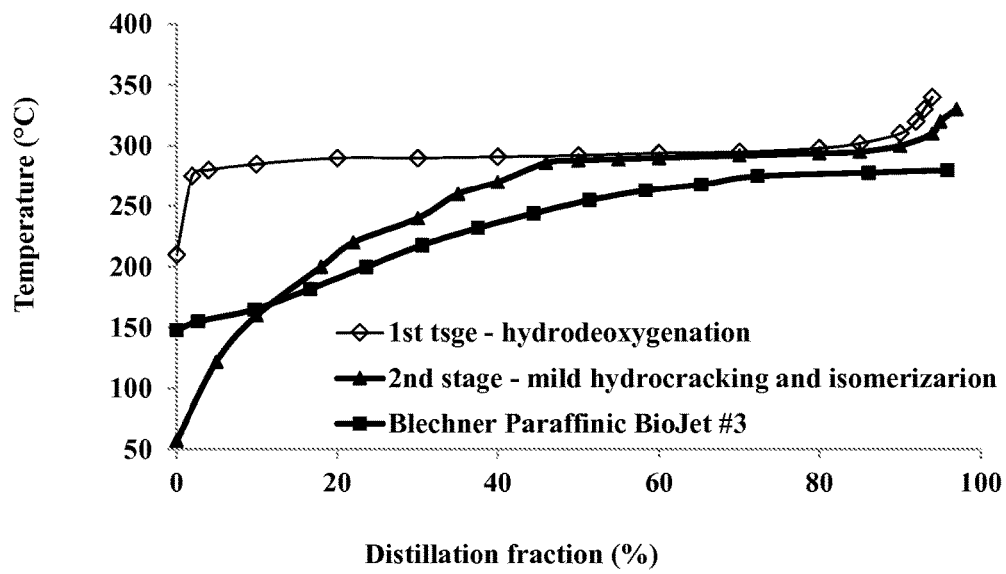
FIG. 9 shows distillation curves of jet fuel fraction formed from soybean oil with the aid of SAPO-11 of the invention.

FIG. 9 describes distillation curves of organic products from 1st, 2nd stage and the final paraffinic BioJet fraction. It is noted that in this example, where the catalyst employed in the first step is not the catalyst of the invention, the jet fuel composition collected is free of aromatic compounds.

The invention claimed is:

1. SAPO-11 possessing a silicon distribution, wherein the distribution of silicon atoms among the five silicon sites, indicated by the notation (0Si,4Al); (1Si,3Al), (2Si,2Al), (3Si,1Al) and (4Si,0Al), identifying the composition of the four nearest neighbor positions of a silicon atom in terms of the silicon and aluminum atoms filling said neighbor positions, is determined by a deconvoluted $^{29}$Si-NMR spectrum of said SAPO-11, said spectrum exhibiting five peaks centered at −90 ppm (±2), −97 ppm(±2), −103 (±2) ppm, −108 (±2) ppm and −112 (±2) ppm, assigned to (0Si,4Al); (1Si, 3Al), (2Si,2Al), (3Si,1Al) and (4Si,0Al) sites respectively, wherein said $^{29}$Si-NMR spectrum indicates the predomination of aluminum-rich silicon sites (0Si,4Al) and (1Si,3Al), with the peaks assigned to (0Si,4Al) and (1Si,3Al) sites being the first and second most intense peaks, respectively, such that the major peak assigned to the (0Si,4Al) site indicates that the molar concentration of said site is not less than 60 molar % of the total number of silicon sites, wherein said SAPO-11 has an external surface area of above 200 m$^2$/g, and wherein said SAPO-11 is hydrothermally stable in a hydrous environment formed in hydroprocessing of a lipid feedstock at 370° C.

2. SAPO-11 according to claim 1, wherein the sum of the molar concentrations of the (0Si,4Al) and (1Si,3Al) sites constitutes not less than 75% of the total number of silicon sites, as indicated by the deconvulated results of the $^{29}$Si-NMR spectrum of said SAPO-11.

3. SAPO-11 according to claim 1, wherein the ratio of the concentration of the (0Si,4Al) site to the concentration of the (1Si,3Al) is greater than 3:1, as indicated by the deconvulated results of the $^{29}$Si-NMR spectrum of said SAPO-11.

4. SAPO-11 of claim 1, possessing silicon distribution, based on the deconvoluted results of $^{29}$Si-NMR spectrum, as tabulated:

| site | (0Si, 4Al) | (1Si, 3Al) | (2si, 2Al) | (3Si, 1Al) | (4Si, 0Al) |
| --- | --- | --- | --- | --- | --- |
| NMR peak centered at | −90 ppm (±2) | −97 ppm (±2) | −103 ppm (±2) | −108 ppm (±2) | −112 ppm (±2) |
| Molar % | 60-75 | 10-20 | 7-12 | 6-8 | 4-6. |

5. SAPO-11 according to claim 1, wherein the external surface area is from 200 m$^2$/g to 250 m$^2$/g.

6. A catalyst Pt/(SAPO-11+Al$_2$O$_3$), wherein the SAPO-11 component of said catalyst is as defined in claim 1.

7. A process for producing a liquid fuel composition, comprising hydroprocessing a feedstock in the presence of a catalyst according to claim 6, wherein said feedstock comprises oxygen-containing compounds.

8. A process according to claim 7, comprising:
providing a feedstock oil selected from the group consisting of vegetable oil, animal oil, and mixtures thereof, and hydrodeoxygenating and hydroisomerizing the oil.

9. A process according to claim 8, comprising:
(i) hydrodeoxygenating, hydroisomerizing and aromatizing the feedstock oil in the presence of the catalyst Pt/(SAP0-11+Al$_2$O$_3$), wherein the SAPO-11 component of said catalyst posesses a silicon distribution, wherein the distribution of silicon atoms among the five possible silicon sites, indicated by the notation (nSi,(4-n)Al), 0≤n≤4, identifying the composition of the four nearest neighbor positions of a silicon atom in terms of the silicon and aluminum atoms filling said neighbor positions, is determined by a deconvoluted $^{29}$Si-NMR spectrum of said SAPO-11, said spectrum exhibiting five peaks centered at −90 ppm (±2), −97 ppm(±2), −103 (±2) ppm, −108 (±2) ppm and −112 (±2) ppm, assigned to (0Si,4Al); (1Si,3Al), (2Si,2Al), (3Si,1Al) and (4Si,0Al) sites respectively, wherein said $^{29}$Si-NMR spectrum indicates the predomination of aluminum-rich silicon sites (0Si,4Al) and (1Si,3Al), with the peaks assigned to (0Si,4Al) and (1Si,3Al) sites being the first and second most intense peaks, respectively, such that the major peak assigned to the (0Si,4Al) site indicates that the molar concentration of said site is not less than 60 molar % of the total number of silicon sites to obtain a gas-liquid mixture, wherein the gaseous component of said mixture comprises unreacted hydrogen and light hydrocarbons and the liquid component of said mixture comprises water and an organic liquid;
(ii) separating said gaseous component from said liquid component;
(iii) separating said liquid component into an organic and aqueous phases, and collecting at least said organic phase; and
(v) optionally subjecting said organic phase, or a portion thereof, to hydrocracking in the presence of hydrogen and one or more catalysts.

* * * * *